Sept. 10, 1968  M. E. HULL  3,400,942

COLLAPSIBLE LUGGAGE CARRIER

Filed June 16, 1967

INVENTOR
Marie E. Hull
BY
ATTORNEYS

United States Patent Office 3,400,942
Patented Sept. 10, 1968

3,400,942
COLLAPSIBLE LUGGAGE CARRIER
Marie E. Hull, 734 Wendel Place,
Teaneck, N.J. 07666
Filed June 16, 1967, Ser. No. 646,540
6 Claims. (Cl. 280—39)

ABSTRACT OF THE DISCLOSURE

A collapsible and foldable wheeled luggage carrier is disclosed which comprises a collapsible bottom frame assembly, a collapsible back frame assembly hingeably connected to the bottom frame assembly, and a plurality of wheels rotatably mounted in wheel brackets that are also hingeably connected to the bottom frame assembly, the back frame assembly fitting within the perimeter of the bottom frame assembly when both assemblies are collapsed and folded together.

Background of the invention

The present invention relates to a collapsible wheeled carrier for luggage and similar objects that can be collapsed and folded together to form a compact, easily portable article that can be readily carried by a traveler or which can be stowed in the luggage of the traveler. When it is desired to use the luggage carrier, it can be unfolded and extended to form a wheeled carrier for luggage that can readily be pushed by the traveler and can carry a considerable load of luggage. A collapsible luggage carrier of the type herein described comprises a useful article of commerce for which there has been a long-felt need.

Summary of the invention

The collapsible and foldable wheeled luggage carrier of my invention comprises in its major components a collapsible bottom frame assembly, a collapsible back frame assembly the lower end of which is hingeably connected to the rearward end of the bottom frame assembly and a plurality of wheels rotatably mounted in wheel brackets that are also hingeably connected to the bottom frame assembly. The bottom frame assembly comprises two longitudinally disposed and laterally spaced collapsible bottom frame members each of which comprises at least two telescopic frame sections. The largest of the telescopic frame sections of the bottom frame members are connected at their rearward ends by a main transverse brace member and the smallest of the telescopic frame sections are connected at their forward ends by a front transverse brace member. The back frame assembly comprises two generally vertically disposed and laterally spaced side collapsible back frame members each of which comprises at least two, and advantageously three, telescopic frame sections. The largest of the telescopic frame sections of the collapsible back frame members are hingeably secured at their lower ends to the inner side of the largest of the telescopic frame sections of the bottom frame members adjacent the rearward end thereof. The smallest of the telescopic frame sections of the collapsible back frame members are connected at their upper ends by a transverse handle member. The length of the back frame assembly when the telescopic frame sections thereof are collapsed is less than the length of the bottom frame assembly when the telescopic frame sections thereof are collapsed so that the back frame assembly fits within the perimeter (that is, within the frame members) of the bottom frame assembly when both assemblies are collapsed and folded together.

At least one and preferably all three of the wheels hingeably connected to the bottom frame assembly are of the caster type. That is, the wheels are journalled in U-shaped caster brackets each of which is in turn rotatably secured to a plate which is hingeably connected to the bottom side of the bottom frame member. As a result, the wheels can be folded flat against the bottom frame assembly when the luggage carrier is collapsed and folded for stowage. The bottom frame assembly is also advantageously provided with a mesh-like bottom structure on which small articles of luggage can be supported, and straps fastened to the bottom frame assembly can be provided for securing the luggage in place on the luggage carrier.

Brief description of the drawings

My collapsible wheeled luggage carrier will be better understood from the following description thereof in conjunction with the accompanying drawings in which.

Detailed description

Figure 1:
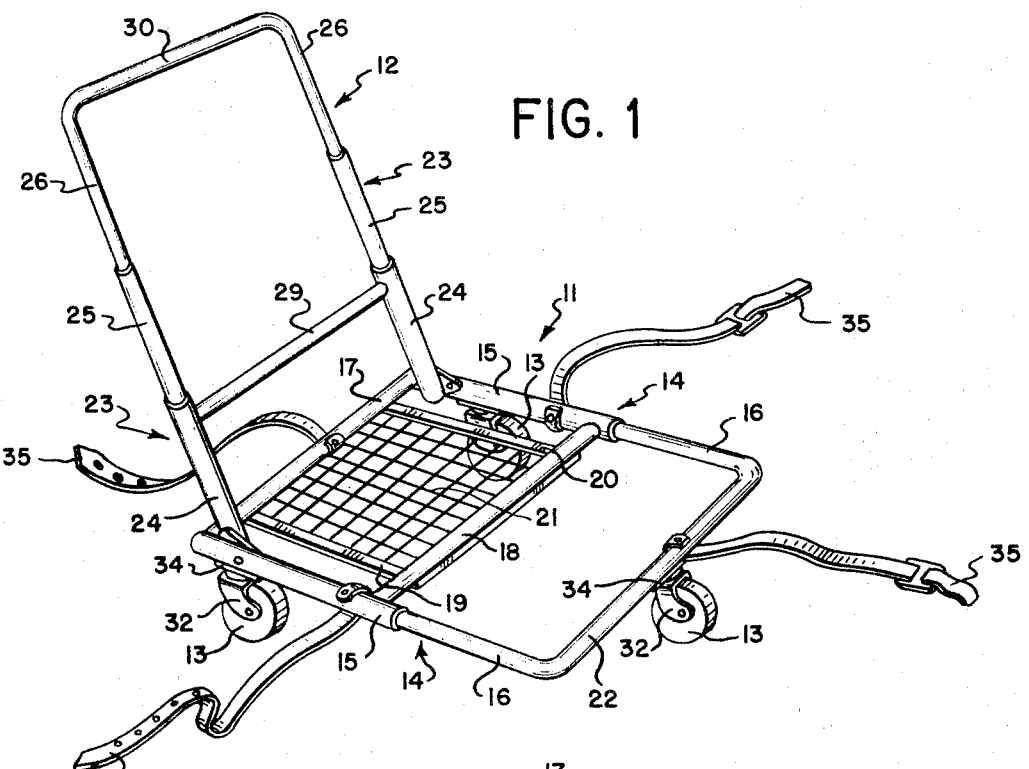
FIG. 1 is a perspective view of an advantageous embodiment of the luggage carrier of my invention in its unfolded and fully extended condition.

As shown in the drawing, the major components of the collapsible and foldable luggage carrier of my invention are a collapsible bottom frame assembly 11, a collapsible back frame assembly 12 the lower end of which is hingeably connected to the rearward end of the bottom frame assembly 11 and a plurality of wheels 13 that are rotatably mounted in wheel brackets that are also hingeably connected to the bottom frame assembly, as hereinafter more fully described.

In the advantageous embodiment of my invention shown in FIG. 1, the bottom frame assembly comprises two longitudinally disposed and laterally spaced collapsible frame members 14. Each of the collapsible frame members 14 comprises two telescopic frame sections 15 and 16 that advantageously are formed of a strong tubular material such as aluminum tubing. The largest of the telescopic frame sections 15 of the laterally spaced frame members 14 are connected at their rearward ends by a main transverse brace member 17 and at their forward ends by second transverse brace members 18 thereby forming a rigid rectangular structure on and around which the remaining components of the luggage carrier can be mounted. The telescopic frame sections 15 and transverse brace members 17 and 18 can be further strengthened by the provision of longitudinal inner frame members 19 and 20 which extend between the transverse brace members 17 and 18 as also shown in the drawing. The frame members 19 and 20 advantageously provide means for supporting an open mesh structure 21 adapted to support small articles that otherwise might fall through the open framework of luggage carrier. The smallest of the telescopic frame sections 16 of the collapsible frame members 14 fit snugly within the larger telescopic frame sections 15 of the frame members 14 and are adapted to slide in telescopic fashion within the larger frame sections 15. The forward ends of the telescopic frame sections 16 are connected by a front transverse brace member 22, the transverse brace member 22 advantageously being integrally formed with the telescopic frame sections 16 from a single piece of tubular material.

Figure 3:
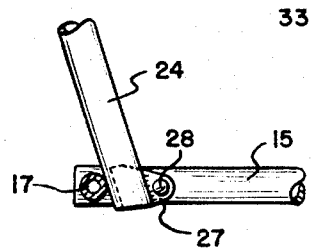
FIG. 3 is a fragmentary view of one side of the luggage carrier showing an advantageous means of hingeably securing the back frame assembly to the bottom frame assembly of the carrier.

The back frame assembly 12 comprises two generally vertically disposed and laterally spaced collapsible back frame members 23. Each of the laterally spaced back frame members 23 comprises at least two, and advantageously three, telescopic frame sections 24, 25 and 26. The largest of the telescopic frame sections 24 of the laterally spaced back frame members 23 are hingeably connected at their lower ends to the inner side of the largest of the telescopic frame sections 15 of the bottom frame assembly 11. The hinge connection advantageously comprises a plate 27 rigidly secured to the telescopic frame section 24 and pivotally connected to the inner side of the telescopic frame section 15 by the pivot 28, as shown best in FIG. 3 of the drawing. Other types of hinge connections well known to those skilled in the art may, of course, be used in place of the hinge connection shown in the drawing.

The upper ends of the largest of the telescopic frame sections 24 are advantageously connected by a transverse brace member 29 to provide a rigid structure on which the other telescopic frame members of the back frame members 23 are mounted. Intermediate telescopic frame sections 25 formed of a strong tubular material such as aluminum tubing fit snugly inside the largest of the telescopic frame sections 24 of the back frame members 23, the telescopic frame sections 25 being adapted to slide in telescopic fashion within the frame sections 24. The upper ends of the intermediate telescopic frame sections 25 may be, but are not necessarily, connected by a transverse brace member (not shown) in the same manner as the upper ends of the largest frame sections 24 are connected by the brace member 29. The smallest of the telescopic frame sections 26 of the back frame members 23 are formed of a strong tubular material such as aluminum tubing and are adapted to fit snugly inside the intermediate frame sections 25 so that they will slide in telescopic fashion to and fro within the frame sections 25. The upper ends of the telescopic frame sections 26 are connected by a transverse handle member 30, the transverse handle member 30 and the smallest of the telescopic frame sections 26 advantageously being formed of a single piece of tubular material as shown in FIG. 1.

Figure 2:
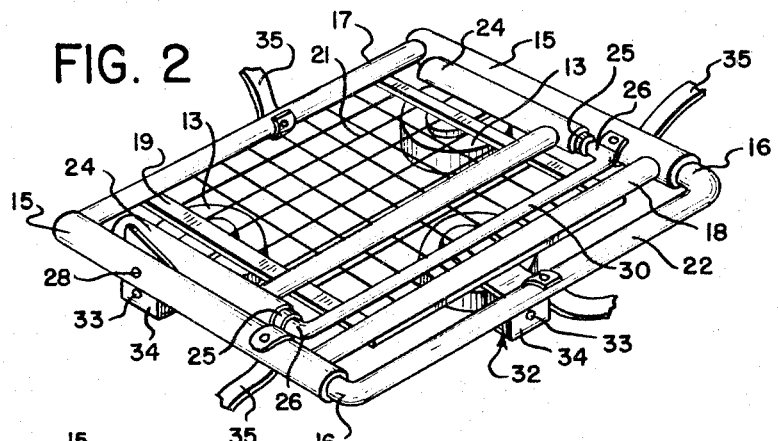
FIG. 2 is a perspective view of the luggage carrier shown in FIG. 1 after it has been collapsed and folded in accordance with my invention.

The wheels 13 are advantageously of the castertype and are hingeably secured to the bottom frame members 14 so that they can be folded flat against the bottom frame assembly 11 when the luggage carrier is collapsed and folded as shown in FIG. 2. Accordingly, the wheels 13 are advantageously rotatably mounted in a U-shaped wheel bracket 32 which, in turn, is rotatably secured by means of a pivot 33 to a hinge plate 34. The hinge plate 34, in turn, is hingeably connected to the bottom side of the side frame sections 15 and transverse brace member 22 as shown in FIGS. 1 and 2. Alternatively, one or more of the wheels 13 may be of the non-swivel or non-caster type in which case the U-shaped wheel bracket 32 is rigidly secured to the respective hinge plate 34. In addition, the wheel 13 secured to the transverse brace member 22 may advantageously be larger in diameter than the wheels 13 secured to the side frame sections 15 so that the bottom frame assembly will be tilted upwardly slightly from back to front. Other forms and types of foldable wheel structures will be apparent to those skilled in the art.

Straps 35 are advantageously provided for securing the articles of luggage to the luggage carrier in a manner known in the art. Moreover, it is obvious that the collapsible carrier of my invention can be used to transport a wide variety of objects and articles in addition to luggage.

Figure 4:
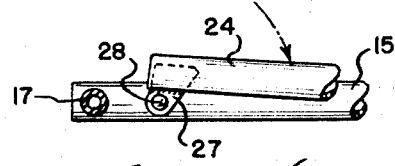
FIG. 4 is a view similar to FIG. 3 showing the back frame assembly and bottom frame assembly in their folded condition.

The luggage carrier of my invention is collapsed and folded to form a compact article as shown in FIG. 2 by first telescoping or collapsing the back frame members 23 of the back frame assembly 12 and then telescoping or collapsing the bottom frame members 14 of the bottom frame assembly 11. The collapsed back frame assembly 12 is then folded downwardly as indicated in FIG. 4 of the drawing. It should be noted that the over-all length of the back frame assembly 12 when it is collapsed is appreciably shorter than the over-all length of the bottom frame assembly 11 when it is collapsed so that the collapsed and folded back frame assembly 12 will fit inside the perimeter (that is, within the confines of the side frame members 14) of the bottom frame assembly 11 as shown in FIG. 2 of the drawing. The wheels 13 and wheel brackets 32 are turned so that they are parallel to the side frame sections 15 and the front brace member 22, respectively, and then are folded flat against the bottom frame assembly about the hinge of the hinge plate 34 as shown in FIG. 2 of the drawing. The straps 35 may be used to retain the wheels and back frame assembly in their flat folded condition. The collapsed and folded carrier of my invention may readily be stored away in the users luggage or at his home in a small storage space. Moreover, in the preferred embodiment of my invention the collapsed and folded carrier is provided with a carrying case or bag into which the folded carrier neatly fits. The carrier in its travel case is an attractive and useful article of commerce.

Although the preferred material of construction for my collapsible luggage carrier is aluminum tubing and plate, it is obvious that it can be constructed of such other similar materials that lend themselves suitably to the same construction and that will give the same service and performance.

From the foregoing description of my collapsible foldable luggage carrier it will be seen that I have made an important contribution to the art in which my invention relates.

I claim:

1. A collapsible and foldable wheeled luggage carrier comprising a collapsible bottom frame assembly, a collapsible back frame assembly the lower end of which is hingeably connected to the rearward end of the bottom frame assembly, and a plurality of wheels rotatably mounted in wheel brackets that are also hingeably connected to the bottom frame assembly, the bottom frame assembly comprising two longitudinally disposed and laterally spaced collapsible frame members each of which comprises at least two telescopic frame sections, the largest of said telescopic frame sections being connected at their rearward ends by a main transverse brace member and the smallest of said telescopic frame sections being connected at their forward ends by a front transverse brace member, the back frame assembly comprising two generally vertically disposed and laterally spaced frame members each of which comprises at least two telescopic frame sections, the largest of the telescopic frame sections of the back frame assembly being hingeably secured at their lower ends to the inner side of the largest of the telescopic frame sections of the bottom frame assembly adjacent the rearward end thereof, and the smallest of the telescopic frame sections of the back frame assembly being connected at their upper ends by a transverse handle member, the length of the back frame assembly when the telescopic frame sections thereof are collapsed being less than the length of the bottom frame assembly when the telescopic frame sections thereof are collapsed whereby the back frame assembly will fit within the perimeter of the bottom frame assembly when both assemblies are collapsed and folded together, each wheel is rotatably mounted in a U-shaped wheel bracket, the U-shaped wheel bracket being secured to a plate that is hingedly secured to the under side of the bottom frame assembly, one of said wheels being located at the rearward end of each of the largest of the telescopic frame sections of the bottom frame members, and a third wheel being located approximately in the center of the front transverse brace member of the bottom frame assembly.

2. The collapsible luggage carrier according to claim 1 in which the collapsible bottom frame assembly comprises two collapsible bottom frame members each of which comprises two telescopic frame sections formed of tubing.

3. The collapsible luggage carrier according to claim 1 in which the back frame assembly comprises two collapsible back frame members each of which comprises three telescopic frame sections formed of tubing.

4. The collapsible luggage carrier according to claim 1 in which the collapsible bottom frame assembly comprises two collapsible bottom frame members each of which comprises two telescopic frame sections formed of tubing and in which the back frame assembly comprises two collapsible back frame members each of which comprises three telescopic frame sections formed of tubing.

5. The collapsible luggage carrier according to claim 1 in which the smallest of the telescopic frame sections and the front transverse brace member of the bottom frame assembly are integrally formed of a single piece of tubing and in which the smallest of the telescopic frame sections and the transverse handle member of the back frame assembly are integrally formed of a single piece of tubing.

6. The collapsible luggage carrier according to claim 1 in which the collapsed and folded carrier is provided with a portable carrying case into which the folded carrier neatly fits.

References Cited

UNITED STATES PATENTS

| | | | |
|---|---|---|---|
| 2,469,242 | 5/1949 | Pohl | 280—36 |
| 2,602,675 | 7/1952 | Forman | 280—36 |
| 2,962,299 | 11/1960 | Dawkins et al. | 280—36 |

LEO FRIAGLIA, *Primary Examiner.*

J. SIEGEL, *Assistant Examiner.*